United States Patent
Edwards

[11] 3,886,763
[45] June 3, 1975

[54] SELF-DRIVEN REFRIGERATOR

[75] Inventor: Thomas C. Edwards, Casselberry, Fla.

[73] Assignee: The Rovac Corporation, Maitland, Fla.

[22] Filed: Feb. 26, 1974

[21] Appl. No.: 445,839

[52] U.S. Cl. ..................... 62/402; 62/87; 417/406
[51] Int. Cl. ............................................. F25d 17/04
[58] Field of Search ......... 62/402, 87, 172; 417/406

[56] References Cited
UNITED STATES PATENTS

| | | | |
|---|---|---|---|
| 2,391,838 | 12/1945 | Kleinhans | 62/402 |
| 2,477,932 | 8/1949 | King | 62/402 |
| 2,524,066 | 10/1950 | Andersen | 62/402 |
| 2,585,570 | 2/1952 | Messinger | 62/402 |
| 2,733,663 | 2/1956 | Marshall | 417/406 |
| 3,686,893 | 8/1972 | Edwards | 62/402 |

Primary Examiner—William J. Wye
Attorney, Agent, or Firm—Wolfe, Hubbard, Leydig, Voit & Osann

[57] ABSTRACT

A refrigeration system employing a rotary unitary compressor-expander for use with a pressurized fluid source and which is powered by the fluid which is being refrigerated. The unitary compressor-expander is formed of a stator having a chamber of oval cross section occupied by a rotor fitted with radially slidable vanes, with the tips of the vanes sealingly engaging the wall of the chamber. The sides of the "oval," which define compressor and expander portions, each have respective inlet and outlet openings. The inlet of the compressor portion is connected to the source of pressurized fluid and the outlet of the expander portion is vented to the cooled space which is at a lower, ambient pressure. For coupling together the outlet of the compressor and the inlet of the expander, a heat exchanger is provided which dissipates the heat of compression with substantially no loss in pressure. The two portions of the compressor-expander are made non-symmetrical so that the differential change in volume during compression is less than the differential change in volume during expansion with the result that the rotor derives its rotative power solely from the pressurized fluid being cooled. Several ways of achieving the desired non-symmetry are disclosed including changing the angle which separates the inlet and outlet ports and making the oval chamber non-symmetrical with respect to the rotor.

8 Claims, 22 Drawing Figures

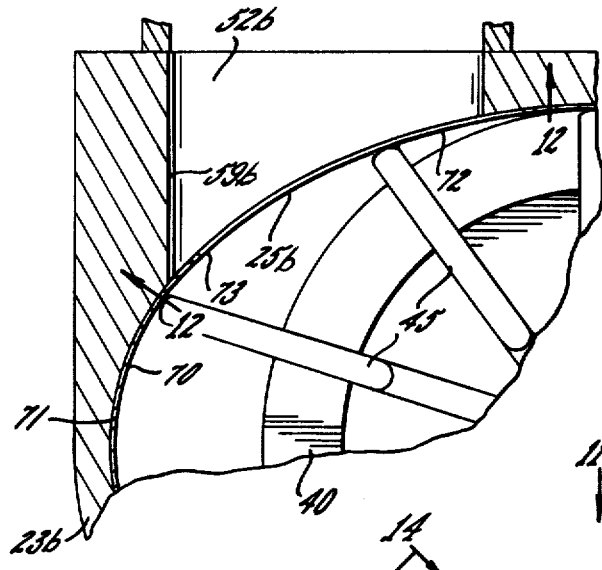
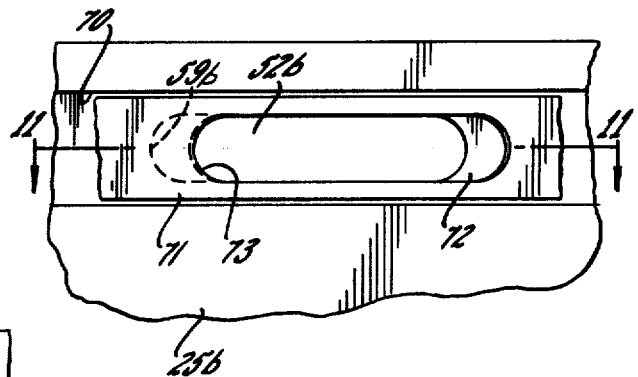
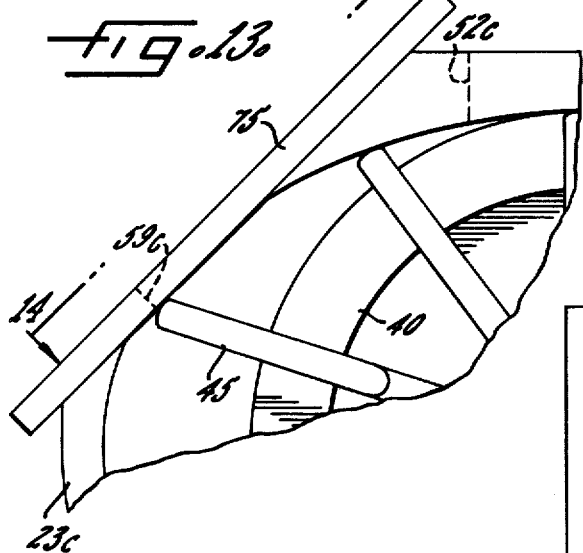
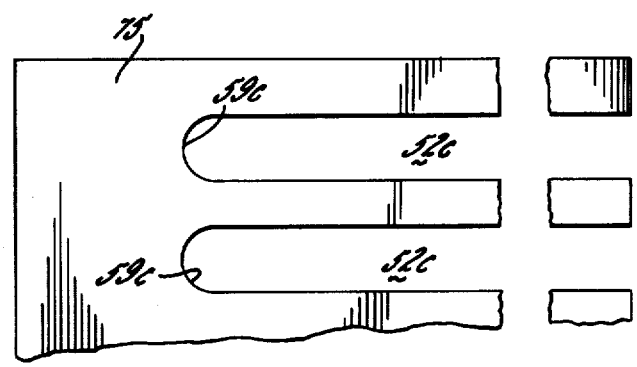
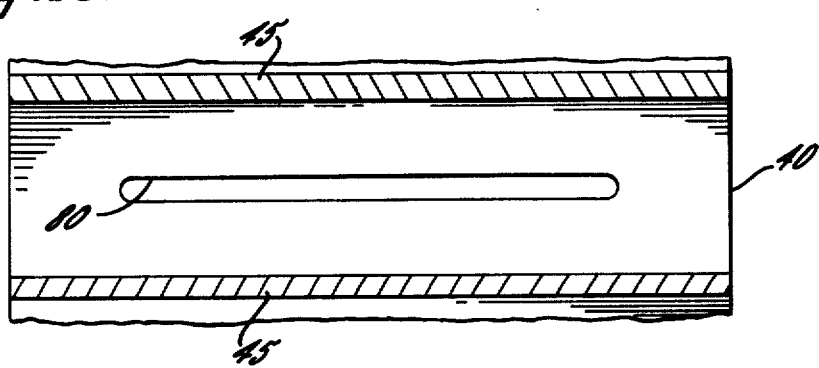

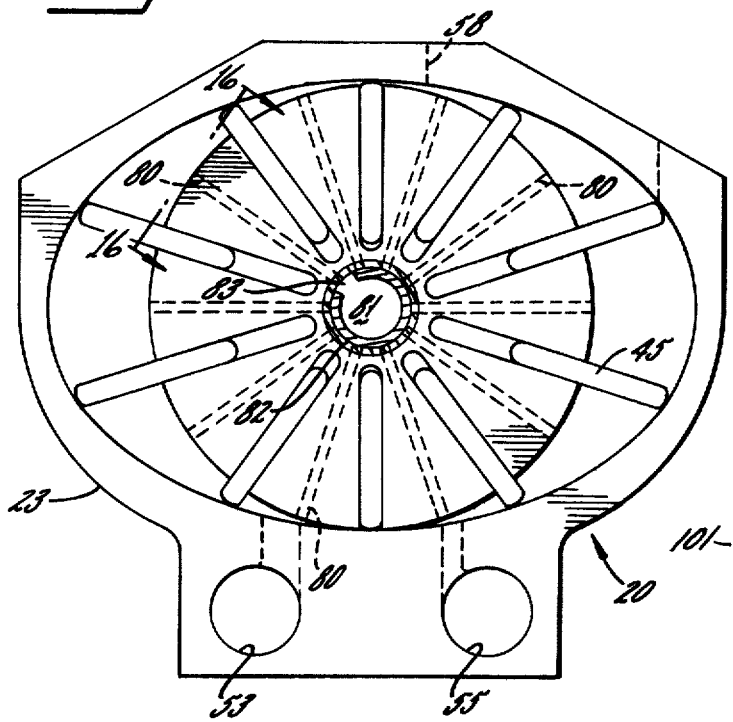
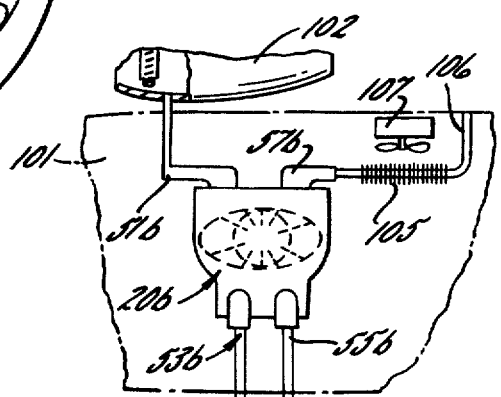
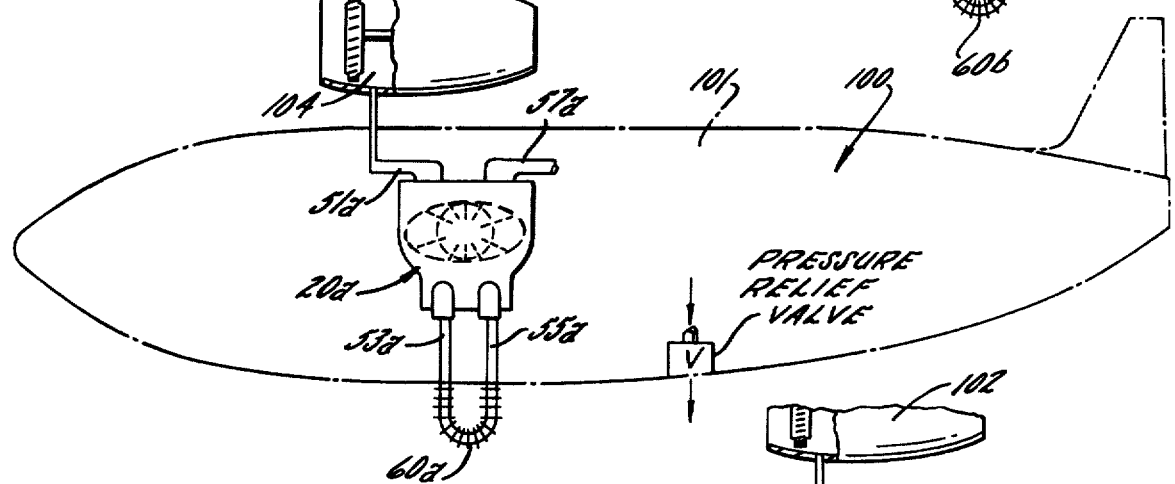
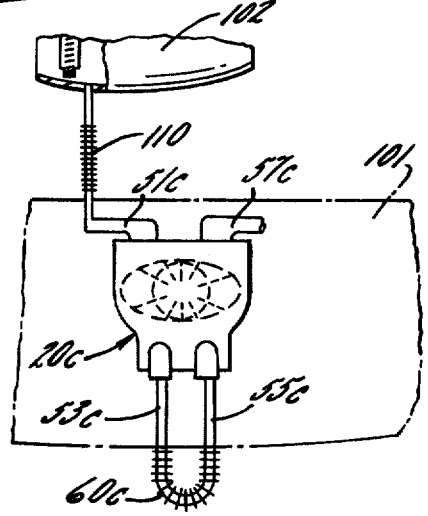

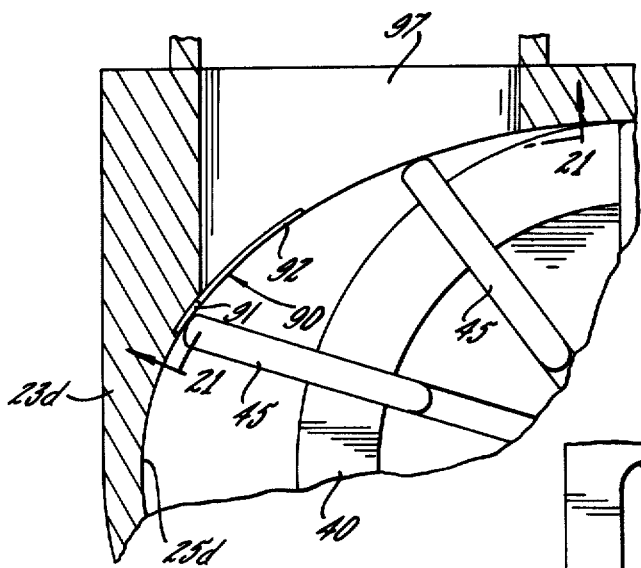
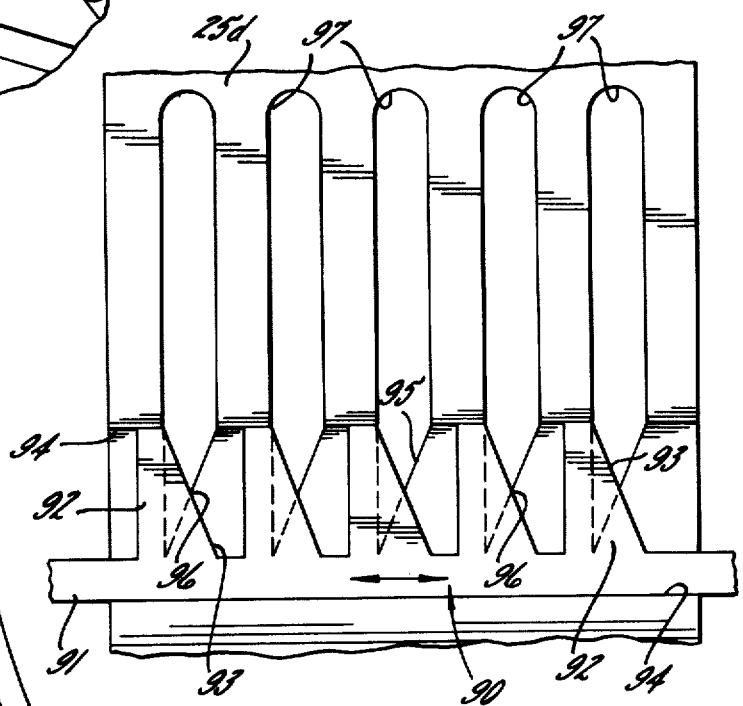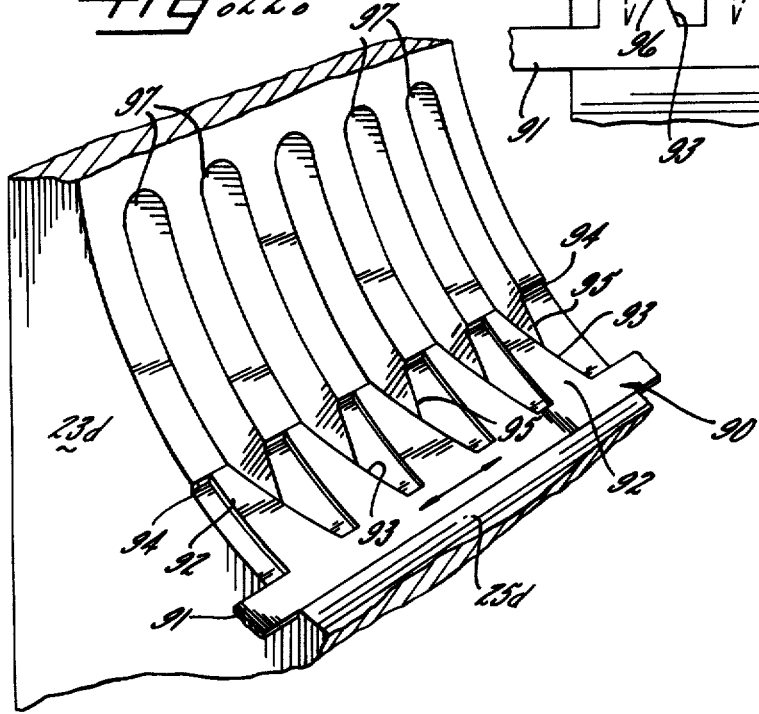

SELF-DRIVEN REFRIGERATOR

In my prior U.S. Pat. No. 3,686,893 a unitary compressor-expander is disclosed having a stator with an oval chamber and a rotor fitted with vanes, the outlet of the compressor portion being connected to the inlet of the expander portion via a heat exchanger, which reduces the temperature of the fluid being acted upon in its compressed state without significantly changing its pressure. The rotor is mechanically driven by any desired source of rotative power. For example, where the device is used as an automobile air conditioning unit, the rotor may be either directly coupled to the engine or driven by an electric motor.

It is an object of the present invention to provide a refrigeration system which employs a pressurized fluid source for feeding the compressor portion of a unitary compressor-expander, and with the latter being so constructed that it is powered by the energy in the fluid being acted upon. This makes possible a refrigeration unit which is both compact and highly simple, requiring no connection to any motor or prime mover whatsoever.

It is a more specific object of the present invention to provide a combined refrigerating and pressurizing system for a pressurized aircraft in which the compressor stage of a jet engine is employed as a source of pressurized fluid and in which cool air at the outlet of the compressor-expander unit is discharged into the interior of the aircraft, with the excess of fluid being discharged from the aircraft via a relief valve or the like which has been set to retain a desired cabin pressure. In short, it is one of the objects of the present invention to utilize the same relatively hot air which results from compression in a jet engine as a cooling medium in the cabin and/or avionics of an aircraft or the like.

It is a more generalized object to provide a refrigerating unit which is capable of operating from any pressurized source of air, with the air being cooled to any desired level for cooling of a chamber either directly or through a heat exchanger and with the cooling being brought about by reason of the potential energy of the pressurized air at the source.

Other objects and advantages of the invention will become apparent upon reading the attached detailed description and upon reference to the drawings in which:

FIG. 1 is a vertical cross section of a compressor-expander constructed in accordance with the present invention, taken along the line 1—1 in FIG. 2;

FIG. 11 is a fragmentary elevation showing means for variably shifting the angular position of the inlet port looking along the line 11—11 in FIG. 12;

FIG. 12 is a developed fragmentary face view of the inner wall of the device looking along the line 12—12 in FIG. 11;

FIG. 13 is a fragmentary elevation showing an externally mounted slotted plate for the purpose of varying the angular position of the inlet port;

FIG. 14 is a face view of the plate looking along line 14—14 in FIG. 13;

FIG. 15 is an elevational view showing feeding of the inlet air through the rotor and with a stationary commutating valve member telescoped into a hollow formed in the rotor shaft;

FIG. 16 is a fragmentary view of one of the rotor air ports looking along the line 16—16 in FIG. 15;

FIG. 17 is a diagram showing the invention applied to the cooling and air conditioning of jet aircraft with the compressor-expander drawn in disproportionate scale for clarity;

FIG. 18 is a diagram showing modification of the system of FIG. 16 employing a cabin heat exchanger;

FIG. 19 is a similar view but showing use of a heat exchanger to cool the incoming air;

FIG. 20 is a fragmentary elevation showing a thin axially positionable band for varying the angular position of the inlet port;

FIG. 21 is a developed fragmentary face view of the inner wall and band taken along the line 21—21 of FIG. 20; and FIG. 22 is a fragmentary perspective showing the interrelationship of the band and ports of FIGS. 20 and 21.

While the invention will be described in connection with certain preferred embodiments, it should be understood that I do not intend to be limited to the particular embodiments shown but intend on the contrary to cover the various alternative and equivalent constructions included within the spirit and scope of the appended claims.

Figure 2:
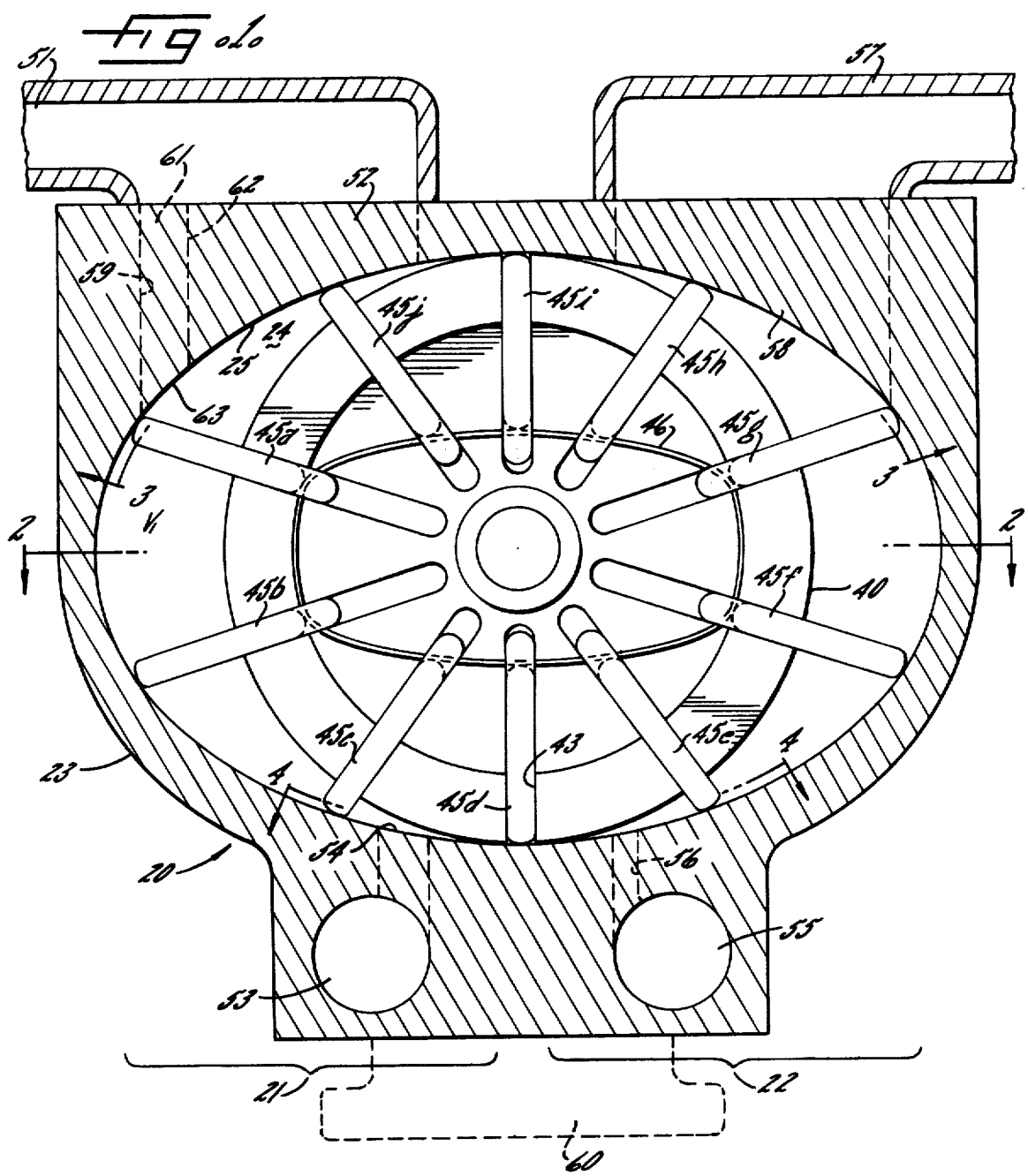
FIG. 2 is a horizontal section looking along the line 2—2 in FIG. 1 and with the vanes omitted to simplify the showing.

Turning now to the drawings and particularly to FIGS. 1 and 2 there is shown a compressor-expander device 20 having a compressor portion 21 and an expander portion 22. The unit has a hollow stator member 23 having a central opening 24 defined by a wall 25 which is of oval, that is, elliptical or near-elliptical, cross section. Enclosing the ends of the chamber 24 are end plates 31, 32 having inner walls 33, 34, respectively. The end plates carry aligned bearings 35, 36, the bearings being surrounded by respective cam tracks 37, 38. Snugly fitted between the end plates is a cylindrical rotor 40 having stub-shafts 41, 42 which engage the bearings. The rotor has machined in it equally spaced, radially extending slots 43 which extend the full length of the rotor. The slots are occupied by vanes 45a–45j, inclusive, which are biased outwardly by centrally contained spring bands 46, 47.

For admitting air to the compressor portion, an inlet connection 51 is provided which communicates with peripherally extending ports 52 in the stator. For discharging the air under pressure a compressor outlet port 53 communicates with openings 54 in the wall of the chamber (see FIGS. 3 and 4). Similarly the expander portion 22 of the device has an inlet opening 55 which communicates with ports 56. Finally the expander portion is provided with an outlet orifice 57 communicating with ports 58.

For positively retracting the vanes on a cyclical basis, the vanes are each provided at the base with axially-extending stubshafts having anti-friction bearings respectively riding in the cam tracks 37, 38. To keep the vanes urged outwardly into engagement with the wall 25 of the stator, biasing spring bands 46, 47 are provided which act simultaneously on all of the vanes. For details of the construction of the vanes and the spring band, reference is made to copending application Ser. No. 400,965, filed Sept. 26, 1973. In order to cool the fluid which emanates from the passage 53 in the compressor portion and which is fed into the inlet 55 of the expander portion, a heat exchanger 60 is interposed.

Figure 5:
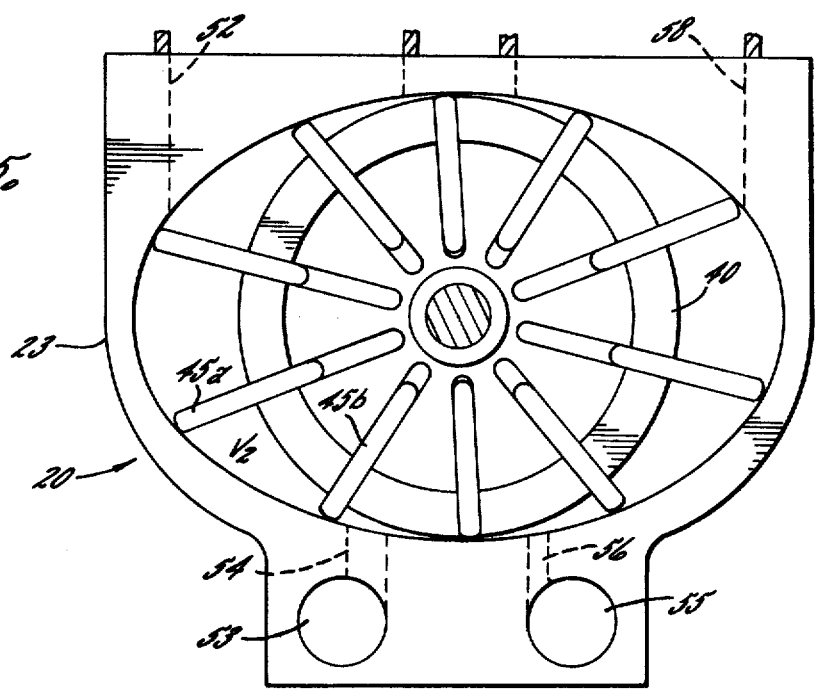
FIGS. 5, 6 and 7 are stop motion views showing successive positions of the rotor in a typical cycle.

It will suffice to say that when the rotor rotates a volume of fluid $V_1$, received via the inlet 51, is confined between vanes 45a, 45b. In operation, the vanes 45a, 45b rotate around into the position shown in FIG. 5 when the volume is reduced to a lesser volume $V_2$, accompanied by an increase in pressure and temperature. The heated, pressurized air is discharged through the opening 53 into the heat exchanger 60.

Figure 6:
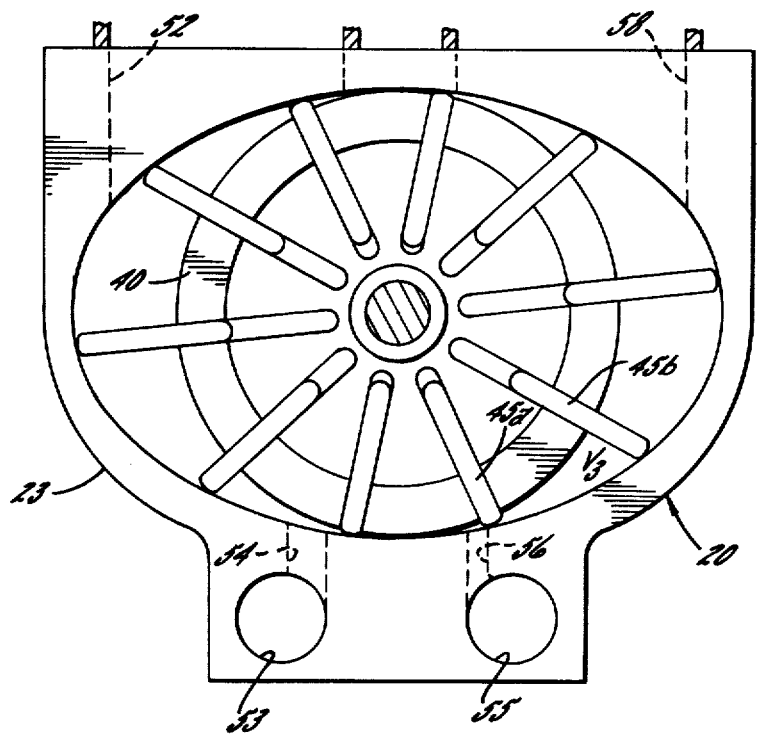
Figure 7:
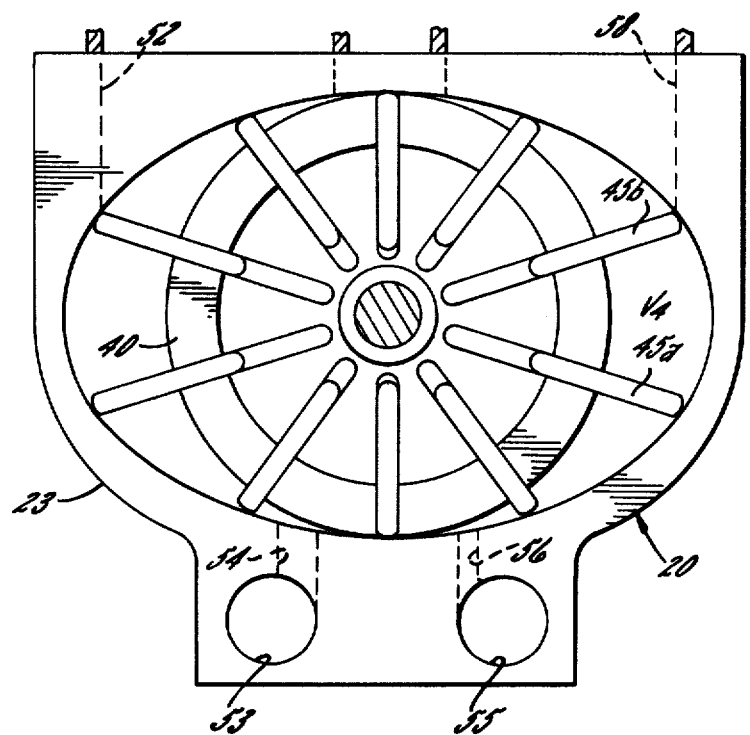

In the heat exchanger the temperature is reduced, and the cool air, under pressure, is fed into expander inlet 55, occupying volume $V_3$ (see FIG. 6). As the rotor continues to rotate the volume $V_3$ is expanded to the volume $V_4$ for discharge through the expander discharge orifice 57 (see FIG. 7). Such operation is discussed in greater detail in my U.S. Patent mentioned above. As shown in that patent, a rotational power source is connected to the shaft of the rotor. The torque of the power source is supplemented by torque resulting from the expansion process. By reason of the expansion, the discharged air is substantially cooler than the air at the inlet so that the device is well suited for use as a simple air refrigeration unit.

It has been assumed in the past that an external drive, in the form of a motor or engine driven fan belt, is necessary to overcome mechanical friction and to make up the difference in the work accomplished by the expansion process as compared to the work required by compression.

In accordance with the present invention the inlet 51 is connected to a source of pressurized fluid, that is, fluid under greater pressure than exists at the outlet 57. It is found that by connecting the inlet 51 to a source of pressurized fluid and by slightly modifying the construction, the device becomes self-powered, and any driving motor, fan belt connection, or the like may be dispensed with. More specifically, the device is modified so that the change in volume of the entrapped air on the expander side exceeds the change in volume of the entrapped air on the compressor side. This, as will be seen, may be accomplished in several different ways but I prefer to achieve such volume relationship by positioning of the inlet and outlet ports.

To illustrate a practical approach in the design of a compressor-expander embodying the present invention, the following analysis is offered: Initially, various parameters will be defined. A reasonable value will be then selected for $V_4$, the outlet volume. Volumes $V_2$ and $V_3$ will be calculated using the procedures taught in U.S. Pat. No. 3,686,893. An expression will then be developed for deriving inlet volume $V_1$ necessary to operate the machine in a self-drive manner. The initial parameters and the volumes calculated above will then be used in this general expression to establish the inlet volume necessary for operation. The result will be a set of parameters which define a real machine capable of operating without the addition of external shaft power under the conditions given. Following this demonstration of feasibility, various methods of achieving the necessary inlet volume will be described.

Definition of Initial Parameters

Volumes $V_1$ through $V_4$, defined above, correspond to four conditions. State 1, which corresponds to $V_1$, is the input condition from the high pressure source. State 2, which corresponds to $V_2$, is the compressed state just prior to entering the heat exchanger. State 3, which corresponds to $V_3$ is the comparatively cool state just after exit from the heat exchanger, but prior to expansion. State 4, which corresponds to $V_4$, is the condition just prior to expulsion of the air from the refrigeration device.

The pressure, volume, and temperature of each of these states is of interest. The following parameters will be taken as given; it is noted that this is reasonable as certain of the parameters are the assumed ambient, while others can be selected to fix design parameters for the machine.

| | | | |
|---|---|---|---|
| $P_1 = 35$psi | $P_2 = 90$psi | $P_3 = 90$psi | $P_4 = 14.7$psi |
| $V_1$ | $V_2$ | $V_3$ | $V_4$ |
| $T_1 = 250°F$ | $T_2 = 450°F$ | $T_3 = 150°F$ | $T_4$ |

In order to completely describe the device, we must select one of the unknown volumes, and from that volume determine those remaining. We shall select a reasonable value for the outlet volume $V_4$.

Let $V_4$ equal 100 in³

The volume $V_3$ will now be determined. Assuming that the refrigeration device operates in a true Brayton cycle, the expansion from state 3 to state 4 will be adiabatic (no heat will be transferred during this process). An adiabatic process can be described by the following expression:

$$PV^k = \text{constant}$$

$$\text{or } P_3 V_3^k = P_4 V_4^k$$

For air $k = 1.4$

Using this relationship and the given conditions yields:

$$V_3 = 27.5 \text{ in}^3$$

Assuming that in the heat exchanger the air acts as a perfect gas, the equation of state for a perfect gas requires:

$$P_3 V_3 / T_3 = P_2 V_2 / T_2$$

My prior patent teaches "volume compensation" designed to maintain $P_3$ substantially equal to $P_2$. Using these relationships yields:

$$V_2 = 41.0 \text{ in}^3$$

This short analysis has generated a typical set of parameters which will be used in the development below to calculate an inlet volume $V_1$ which will allow the device to operate without the addition of shaft work under the defined parameters.

Derivation of Inlet Volume As A Function of Other Device Parameters

Consider any compression process from expanded state 1 to compressed state 2: The work required to perform the compression can be described as:

$$_1W_2 = \int_{V_1}^{V_2} P\,dV$$

Where
P is the pressure as a function of volume
dV is an incremental change in volume of the compressor cavity
$V_1$ is the original volume or inlet volume and
$V_2$ is the final or compressed volume.

If the compression process behaves in a polytropic manner, the following relationship holds:

$$PV^n = \text{constant}$$

Where n is the polytropic index for the process.
This relationship can also be stated as:

$$P_1V_1^n = PV^n$$

or $P = P_1V_1^n/V^n$

Substituting this relationship into the work integral yields:

$$_1W_2 = \int_{V_1}^{V_2} \frac{P_1V_1^n}{V^n}dV$$

or $$_1W_2 = P_1V_1^n \int_{V_1}^{V_2} (V)^{-n} dV$$

Integration of this expression yields a usable expression for the work required for compression as a function of pressure, volume, and the polytropic index:

$$_1W_2 = P_1(V_1)^n/1-n\ [(V_2)^{1-n} - (V_1)^{1-n}]$$

Now consider any expansion process from compressed state 3 to expanded state 4. The work performed by the expansion process can be described as:

$$_3W_4 = -\int_{V_3}^{V_4} P\,dV$$

Where
P is the pressure as a function of volume
dV is an incremental change in volume of the expander cavity
$V_3$ is the compressed volume
$V_4$ is the final expanded volume and the negative sign indicates work done by the system.

Manipulation similar to that shown above yields an expression for the work generated by the expansion as a function of pressure, volume, and the polytropic index:

$$_3W_4 = P_3(V_3)^n/1-n\ [(V)_3^{1-n} - (V4)^{1-n}]$$

For simplicity, this initial analysis will consider a machine with no frictional losses. The object of the analysis is to derive an expression for the inlet volume $V_1$ which will allow the machine, in the presence of a pressure differential between inlet and outlet ports, to operate without the addition of shaft work. Having neglected frictional losses the only work involved in the system is the work performed on the air in the compression process and the work performed by the air is the expansion process. Equating these two values satisfies the requirement that no additional shaft work be provided. Using the above relationship yields:

$$_1W_2 = {_3W_4}$$

$$P_1V_1^n/1-n\ [(V_2)^{1-n} - (V_1)^{1-n}] = P_3V_3^n/1-n\ [(V_3)^{1-n} - (V_4)^{1-n}]$$

$$(V_1)^n(V_2)^{1-n} - V_1 = P_3(V_3)^n/P_1\ [(V_3)^{1-n} - (V_4)^{1-n}]$$

An examination of the above relationship indicates that all the values necessary to solve for $V_1$ have been determined in the preceding section. Inserting these values into the relationship yields:

$$0.227(V_1)^{1.4} - V_1 = 28.6$$

This relationship can be solved by iteration which yields:

$$V_1 = 85\ \text{in}^3$$

At the outset it was noted that the above calculation was based on the assumption that there were no mechanical losses in the system. For this reason that calculation has no relationship to system operating speed. However, essentially the same procedure can be used in evaluating the system in the presence of mechanical friction. The expressions developed for the work of compression and the work of expansion are still valid. The net effect is to require that the work generated by the expansion offset both the work of compression and the work needed to overcome mechanical friction at some mean operating speed. This can be stated as:

$$_1W_2 - W_f = {_3W_4}$$

Utilizing the expressions for the work required for compression and the work generated by expansion yields:

$$P_1V_1^n/1-n\ [(V_2)^{1-n} - (V_1)^{1-n}] - W_f = -(P_3V_3^n)/(1-n)\ [(V_4)^{1-n} - (V_3)^{1-n}]$$

$$(V_1)^n(V_2)^{1-n} - V_1 = P_3V_3^n/P_1\ [(V_3)^{1-n} - (V_4)^{1-n}] + W_f(1-n)/P_1$$

Where $W_f$ is the mechanical work necessary to overcome friction at some mean operating speed.

Using the values calculated in the preceding section yields:

$$0.227(V_1)^{1.4} - V_1 = 28.6 - 0.0114W_f$$

Assuming that at the mean operating speed of the device, 500 inch-pounds of work are necessary to overcome mechanical losses, the equation then becomes:

$$0.227(V_1)^{1.4} - V_1 = 22.9$$

Solving this equation by iteration yields:

$$V_1 = 75\ \text{in}^3$$

Thus, the consideration of mechanical friction requires the 85 cubic inch inlet volume of the perfect machine be reduced to 75 cubic inches for the real machine. Note that the volume calculated is for the mean operating speed under the given conditions and that minor volume adjustments are utilizable to vary the operating speed. In this way parameters for a real machine have been derived. This machine will generate cooling without the addition of external shaft work. Note that the amount of cooling has not been calculated as it is fully taught in my prior patent.

It may be difficult to intuitively appreciate that a decrease in inlet volume is necessary to compensate for mechanical friction. However, reference to FIGS. 8 and 9 will demonstrate this relationship.

Figure 8:
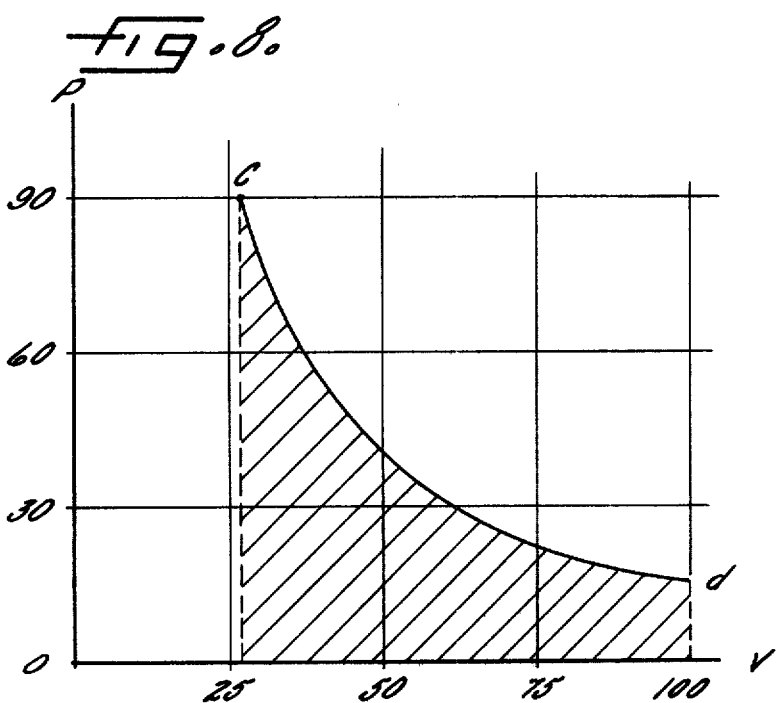
FIG. 8 is a P-V diagram illustrating the expansion process.

FIG. 8 is a pressure-volume plot for the expansion process. The points corresponding to the compressed and expanded states (Points c and d respectively) are plotted and joined by an adiabatic curve. The area under the curve, shown cross hatched in FIG. 8, represents the amount of work generated during this expansion process. The machine described in the above development, and the development itself were based on the fact that the conditions at states c and d never varied; i.e., $P_3$, $P_4$, $V_3$, and $V_4$ always assume the same value. The preceding development was also based on the fact that the expansion process is adiabatic; in other words the path between states d and c never varies. Considering these factors it is seen that the work generated by the expansion never varies, for the conditions given.

Figure 9:
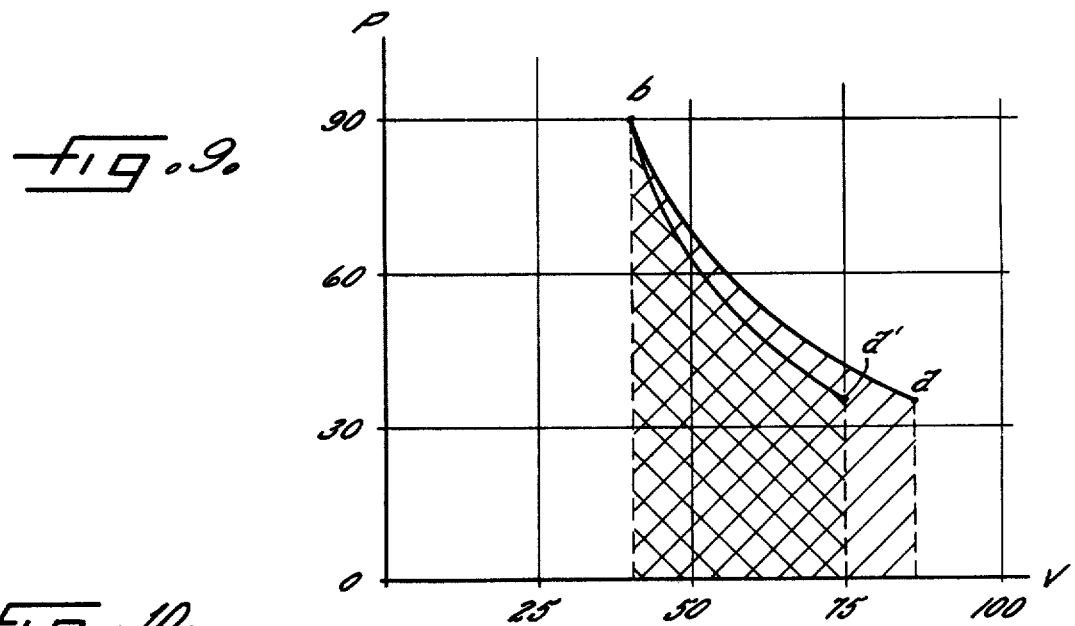
FIG. 9 is a P-V diagram showing the process of compression.

FIG. 9 is a pressure-volume plot for the compression processes. It is seen that there is a single point (point b) plotted for the pressure and volume of the compressed state. However, two values are plotted for the inlet states: point a which corresponds to the ideal machine, and point a' which corresponds to the real machine. An adiabatic curve joins points a and b. As in the above development, the area under this curve, the entire crosshatched area, represents the amount of work necessary to perform the compression in the ideal machine. Comparison of this area with the area under the curve in FIG. 8 reveals that they are identical; this satisfies the starting assumption for the development of the ideal machine, i.e., the work of compression equals the work of expansion. Points a' and b are also joined by a curve which in this case is not adiabatic because the inclusion of mechanical friction makes the process non-reversible. This curve is not completely accurate in its description of the process, however, it is sufficient for purposes of this discussion. The work required for compression in the real machine is the area under this curve, shown in double crosshatched fashion. This illustrates that in the real machine the work generated by expansion is greater than the work required for compression, the amount of the differences being represented by the single crosshatched portion of FIG. 9. That amount of work is available to overcome mechanical friction in the device.

Achieving of Necessary Inlet Volume

It is implicit in the above development that if the conditions under which the device operates never change, the inlet volume need never change. It can also be appreciated that if the device need operate under only a limited range of conditions, then a mean value for inlet port size can be selected which will satisfy this entire range of conditions. The main result of this approach would be a slight variation of device speed and efficiency as conditions change.

It should also be appreciated that if a means of control over the conditions under which the device operates is achieved the device itself can be designed with a fixed inlet volume. Thus, for instance, means of regulating the pressure differential between the inlet and outlet ports, such as by use of pressure regulators, would allow the necessary means of control.

A preferred means for achieving this average value of inlet volume is shown in FIG. 1. As demonstrated above, the inlet volume $V_1$ is defined between two adjacent vanes when the trailing vane passes the inlet port wall thereby completely enclosing the volume. Assuming counterclockwise rotor rotation, and ignoring for the moment the presence of plug 61, FIG. 1 shows $V_1$ about to be defined between vanes 45a and 45b as vane 45a passes port wall 59 of inlet port 52. Thus, it is seen that the position of port wall 59 defines the portion of oval wall 25 which will be encompassed by adjacent vanes when the volume is defined. If wall 59 is repositioned to the right of the position illustrated, $V_1$ is decreased as it is defined nearer the flattened section of the oval. Similarly if the wall 59 is repositioned to the left of the position as illustrated, $V_1$ is increased. It should therefore be appreciated that if the device is intended for operation under only a limited range of conditions, the position of port wall 59 can be selected as a compromise which will satisfy that entire range of conditions. It should also be realized that the same result can be accomplished by modifying the shape of oval wall 25 in the inlet area.

Although the selection of a mean design valve for $V_1$ may satisfy many requirements, it may become desirable in certain cases to achieve variable means of inlet port compensation. This need could arise for example where the device is required to operate in widely varying conditions, or where great efficiency is required. Various embodiments of adjustable inlet port compensation will be described.

Figure 3:
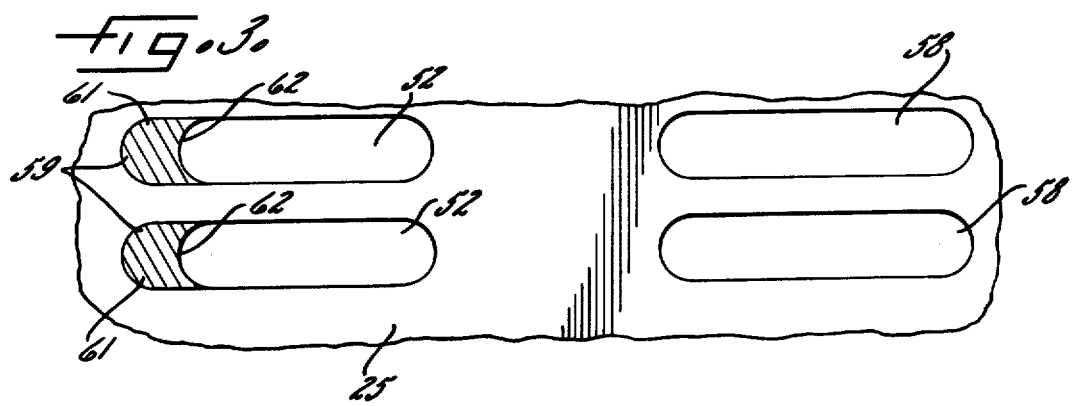
FIG. 3 is a fragmentary section looking along the arcuate line 3—3 in FIG. 1 and showing the inlet and outlet ports.
Figure 2:
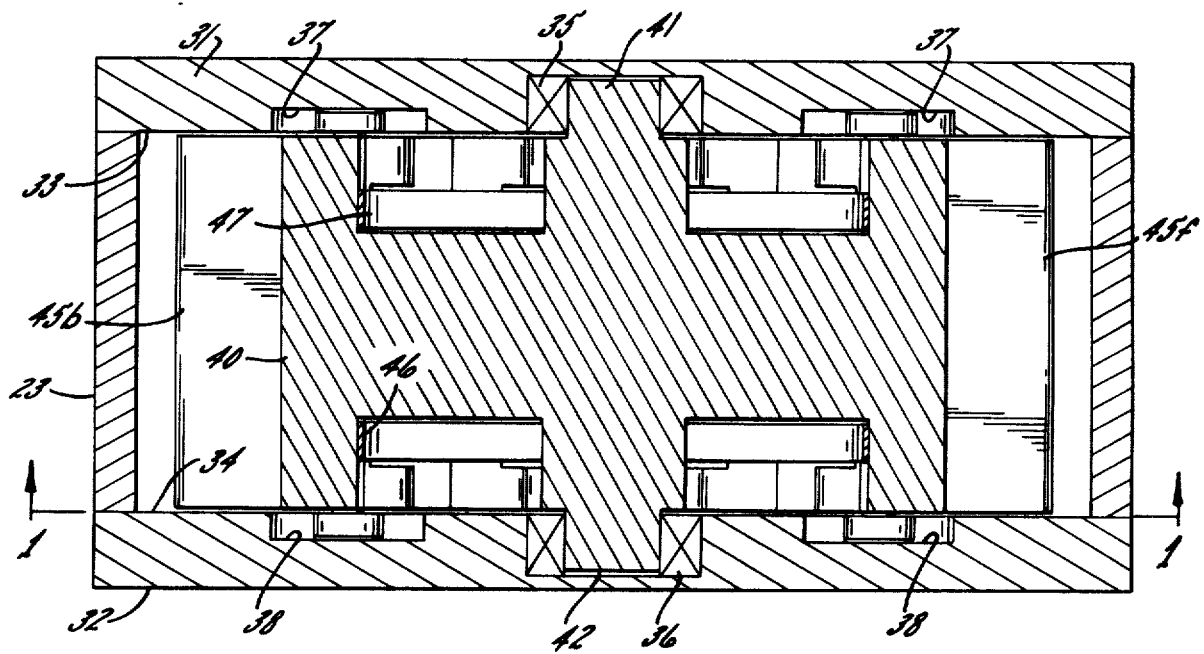
Figure 4:
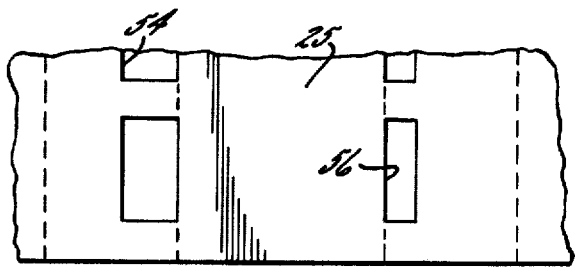
FIG. 4 is a fragmentary section taken along the arcuate line 4—4 in FIG. 1 showing the heat exchanger ports.

One relatively simple means of port compensation is illustrated in FIGS. 1 and 3. It is seen that plugs 61 are inserted into ports 52 thereby filling a portion of the inlet port. As illustrated the surface 63 of these plugs conforms to the oval shape of the chamber effectively sealing a portion of the port and creating a new port wall 62. It should therefore be appreciated that the inlet volume $V_1$ can be adjusted to any size smaller than that defined by port wall 59 by inserting a plug of the proper size to create a new port wall 62.

Figure 10:
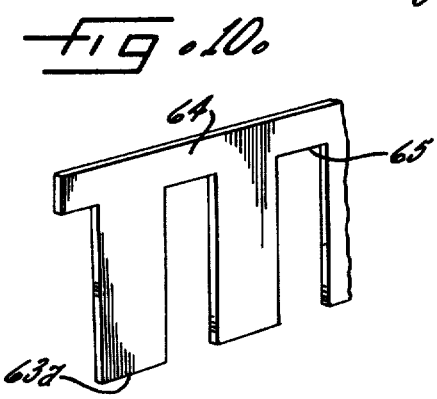
FIG. 10 is a view of a portion of a composite plug used to achieve variable inlet port compensation.

Incremental adjustment of port wall position can be achieved without the need to completely interchange plugs by utilizing a composite plug formed of individual strips 64 one of which is illustrated in FIG. 10. Of course, using this approach the port openings must be of rectangular cross section. The individual strips are nested and vertically adjustable in port 52. When a strip 64 is lowered such that shoulder 65 contacts the exterior of the stator, the strip fills its corresponding portion of the port and its surface 63a is made to coincide with the oval stator chamber, thereby effectively forming a new port wall. Using this arrangement, $V_1$ can be incrementally decreased from the size defined by port wall 59 by sequentially lowering individual strips 64 until the desired inlet volume is achieved.

A means of inlet port compensation wherein the inlet port is formed on a continuous band which is slidably engaged with the stator surface is illustrated in FIGS. 11 and 12. As shown, the stator surface 25b has been modified by cutting into the surface a groove or recess 70 which is continuous around the entire inner surface of the stator. Disposed within this recess and completely filling it is continuous band 71 thereby providing a composite continuous stator surface. Disposed in band 71 is port slot 72 of substantially the same shape as inlet port 52b. When the band is positioned such that its port slot coincides with inlet port 52b $V_1$ is defined by port wall 59b as described above. However, when the band is positioned such that slot 72 does not coincide with the inlet port (as shown in FIG. 12) it is seen that slot wall 73 controls the inlet volume and port wall 59b is ineffective. Thus the circumferential position of band 71 is used to control the inlet volume.

Another means of port compensation utilizing a suitably contoured band is illustrated in FIGS. 20–23. A shallow axial slot 94 is formed in rotor surface 25d for receiving a relatively thin band 90. The band has an elongated portion 91 which is extended in a suitable manner to the exterior of the compressor-expander for control of the axial position of the band. Extending from elongated portion 91 are projections 92, one of such projections being associated with each inlet port segment. The shape of each inlet port 97 has been modified to present an angular face 95 for cooperating with an opposed angular face 93 on each band projection 92, the angular faces forming a junction at apex 96. Axial positioning of band 90 controls the angular position of apex 96 thereby defining the inlet volume. Band 90 is constructed as thin as possible while assuring structural integrity so as to minimize the depth of slot 94; such construction minimizes inter-chamber leakage between the vane tip and the sections of slot 94 located between projections 93. If the band thickness is kept in the range of, say, 0.005 to 0.010 inches, the resulting leakage is negligible due to the throttling effect resulting from the relatively high rotor speeds, and the small pressure differential in the area of the intake port. While cooperating faces 93 and 95 of the band and slot respectively have been illustrated as linear elements, one or both of such faces may be contoured to compensate for system non-linearities resulting, for example, from an associated control mechanism.

FIGS. 13 and 14 illustrate another relatively simple means of volume compensation. It is seen in FIG. 13 that the corner of stator housing 23c has been removed and replaced with slidable member 75. As shown in FIG. 14 this member includes open ended ports 52c having port walls 59c. This member is slidably engaged with the stator housing as shown in FIG. 13 by means such as protruding tabs engageable into slots in the end plates. Adjustment of the position of plate 75 controls the position of port wall 59c, thereby achieving a variable inlet volume. It is realized that utilization of this embodiment has modified the oval shape of the chamber and thereby required that the shape of cam tracks 37 and 38 described above be modified accordingly.

A final approach to inlet volume compensation is described with reference to FIGS. 15 and 16. It is seen that the inlet port normally disposed on the stator surface has been removed. The rotor has been modified to accept a plurality of hollow passages 80 disposed in a radial fashion in the rotor. The rotor shaft in this embodiment is of tubular nature providing a central cavity 81. Inserted into this central cavity is cylindrical insert 82, which contains slot 83 disposed as shown. This insert remains stationary with respect to the stator within the rotor shaft while the rotor rotates thereby acting as a commutating valve for admitting air to the inlet volume. The angular position of the slot with respect to the stator is variable. In this embodiment, inlet air is introduced into the tubular rotor shaft and is allowed to pass through slot 83 in insert 82 and to enter any passage 80 disposed adjacent to the slot. It should be appreciated therefore that the angular position of slot 83 is used to control the inlet volume.

The means for achieving adjustable port compensation described above can be actuated in various ways. The most straightforward of these approaches is simply manual positioning of the adjustment means in response to some observable parameter such as rotor speed. However, automatic means of control can easily be provided. For example, the position of the adjustment means of FIG. 13 can be controlled by a lever or gearing arrangement arranged to impart linear motion to slidable member 75 in response to a speed sensitive device such as a centrifugal governor. Other mechanical means for providing the linear or rotational motion required by the adjustment means are also available; for example, a tachometer generator may be coupled to the rotor shaft and an electrical actuator responsive to the signal of the tachometer generator coupled to the adjustment means. Although the various means of automatic control discussed above are based on controlling port location as a function of rotor speed, it is realized that control could also be made responsive to other parameters such as output temperature or output flow rate.

In the material above it has been assumed that if multiple ports are used to comprise inlet port 59, each individual port must be controlled. It is also possible, however, to arrange the device such that some but not all of the multiple ports need be controlled. This is accomplished by locating the non-controlled ports on the stator such that the position of their port walls 59 corresponds to the minimum inlet volume required. The controlled ports are positioned such that the position of their port wall 59 can be adjusted by one of the above described means between the extremes of minimum and maximum inlet volume. In this way, all ports are active when filling the major cavity which is defined as the minimum inlet volume. After the trailing vane passes port wall 59 of the non-adjustable ports, the adjustable ports are still available to pass the relatively smaller volume of air required to achieve the necessary inlet volume. Thus, all ports are utilized when filling the major cavity, with only the adjustable ports used to completely fill the cavity before the inlet volume is defined.

In accordance with one of the aspects of the present invention, the present device is used to provide a combined air-conditioning and cabin pressurizing system for a jet-type aircraft. Referring to FIG. 17, portions of a jet aircraft 100 are shown including a cabin 101 and jet engine 102. The jet engine has a compressor stage 103 which serves to compress air in the space immediately behind the compressor which is designated 104. A compressor-expander unit 20a is connected so that its inlet 51a receives pressurized air from the space 104 in the jet engine. Such air, after additional compression, is fed into a heat exchanger 60a and returned to the device. The air is then allowed to expand on the expansion side, discharging into the cabin via the orifice 57a. Such air not only cools the cabin but builds up pressure therein. The level of pressure may be set by adjustment of a conventional pressure relief valve V which vents to outside of the cabin.

If it is not desired to use the compressor-expander for pressurizing the cabin, the system may be modified to include a cabin heat exchanger so that the air from the orifice 57a is directly vented. Thus referring to FIG. 18 where the same reference numerals are employed with the addition of subscript b, the compressor-expander 20b receives air under pressure from the compressor stage via inlet connection 51b. The connections 53b, 55b are connected to heat exchanger 60b just as in the case of FIG. 17. However, the air discharge orifice 57b is passed through a cabin heat exchanger 105 and thence to vent 106 for discharge outside of the cabin. A suitable fan 107 blows air through the cabin heat exchanger.

In the embodiment illustrated in FIGS. 17 and 18 pressurized air from the jet compressor is received at a relatively high temperature. As illustrated in FIG. 19 such temperature may be lowered, if desired before feeding the air to the inlet 51c by interposing an auxiliary inlet heat exchanger 110 which is outside the cabin and cooled by the slip stream.

As used herein the term "constant fluid pressure" between compressor outlet port 53 and expander inlet port 55 has to do with the fact that volume $V_3$ is so adjusted that it is less than the volume $V_2$ to take into account the cooling which occurs in the heat exchanger 60. Since equal masses of air are handled by $V_2$ and $V_3$ at each portion of the cycle there is, except for throttling effect, no increase or decrease in pressure between ports 53, 55. Also as used herein the term "ambient" refers generally to the pressure at point of discharge of the orifice 57.

I claim as my invention:

1. A rotary compressor-expander for use as a refrigeration device in conjunction with a pressurized fluid source having a pressure above the ambient level, comprising in combination, a stator including a compressor chamber and an expander chamber, the compressor and expander chambers each having inlet and outlet ports, vane-type rotor means rotatably mounted within the chambers and having a plurality of vanes maintained substantially in contact with the walls of the chambers for defining individual segments, end plates for supporting the rotor means and sealing the chambers and the segments therewithin, rotation of the rotor means serving to progressively decrease the volume of the compressor segments and increase the volume of the expander segments, the inlet port of the compressor chamber being connected to the pressurized fluid source, a heat exchanger connected between the compressor outlet port and the expander inlet port for removing heat from the fluid being cooled while maintaining a substantially constant fluid pressure, the compressor and expander chambers being non-symmetrically constructed so that the differential change in volume in the expander chamber per revolution is greater than the differential change in volume in the compressor chamber in such revolution with the result that the rotor is driven by the potential energy in the pressurized fluid being cooled.

2. A rotary unitary compressor-expander for use as a refrigeration device in conjunction with a pressurized fluid source having a pressure above the ambient level, comprising in combination, a stator including a chamber having compressor and expander portions, both the compressor and expander portions having inlet and outlet ports, a rotor rotatably mounted within the stator and having a plurality of vane slots, end plates for supporting the rotor and sealing the chamber, a plurality of slidable vanes mounted in the vane slots and outwardly biased so that the tips of the vanes are maintained substantially in contact with the wall of the chamber to form individual cavities the volumes of which are progressively decreased in the compressor portion and progressively increased in the expander portion, the inlet port of the compressor portion being connected to the pressurized fluid source, a heat exchanger connected between the compressor outlet port and the expander inlet port for removing heat from the fluid being cooled while maintaining a substantially constant fluid pressure, the compressor and expander portions being non-symmetrically constructed so that the work done on the fluid in the compressor portion during each shaft revolution is less than the work done by the expansion of the fluid in the expander portion during such shaft revolution with the result that the rotor is driven by the pressurized fluid being cooled.

3. A rotary unitary compressor-expander for use as a refrigeration device in conjunction with a pressurized fluid source having a pressure above the ambient level, comprising in combination, a stator including a chamber having compressor and expander portions, both the compressor and expander portions having inlet and outlet ports, a rotor rotatably mounted within the stator and having a plurality of vane slots; end plates for supporting the rotor and sealing the chamber, a plurality of slidable vanes mounted in the vane slots and outwardly biased so that the tips of the vanes are maintained substantially in contact with the wall of the chamber to form individual cavities the volumes of which are progressively decreased in the compressor portion and progressively increased in the expander portion, the inlet port of the compressor portion being connected to the pressurized fluid source, a heat exchanger connected between the compressor outlet port and the expander inlet port for removing heat from the fluid being cooled while maintaining a substantially constant fluid pressure, the compressor and expander portions being non-symmetrically constructed so that the differential change in volume in the expander portion per revolution is greater than the differential change in volume in the compressor portion in such revolution with the result that the rotor is driven by the potential energy in the pressurized fluid being cooled.

4. A rotary unitary compressor-expander for use as a refrigeration device in conjunction with a pressurized fluid source having a pressure above the ambient level, comprising in combination, a stator including a chamber having compressor and expander portions, both the compressor and expander portions having inlet and outlet ports, a rotor rotatably mounted within the stator and having a plurality of vane slots, end plates for supporting the rotor and sealing the chamber, a plurality of slidable vanes mounted in the vane slots and outwardly biased so that the tips of the vanes are maintained substantially in contact with the wall of the chamber to form individual cavities the volumes of which are progressively decreased in the compressor portion from a volume $V_1$ to a volume $V_2$ and progressively increased in the expander portion from a volume $V_3$ to a volume $V_4$, the inlet port of the compressor portion being connected to the pressurized fluid source, a heat exchanger connected between the compressor outlet port and the expander inlet port for removing heat from the fluid being cooled, the volume $V_3$ being less than the volume $V_2$ by an amount sufficient to compensate for contraction of the fluid resulting from the cooling thereof in the heat exchanger and to achieve substantially the same pressure at the respective ends of the heat exchanger, the volume $V_1$ being less than the volume $V_4$ so that the work done on the fluid in the compressor portion during each shaft revolution is less than the work done by the expansion of the fluid in the expander portion during such shaft revolution with the result that the rotor is driven by the pressurized fluid being cooled.

5. A rotary unitary compressor-expander for use as a refrigeration device in conjunction with a pressurized fluid source having a pressure above the ambient level, comprising in combination, a stator including a chamber having compressor and expander portions, both the compressor and expander portions having inlet and outlet ports, a rotor rotatably mounted within the stator and having a plurality of vane slots, end plates for supporting the rotor and sealing the chamber, a plurality of slidable vanes mounted in the vane slots and outwardly biased so that the tips of the vanes are maintained substantially in contact with the wall of the chamber to form individual cavities the volumes of which are progressively decreased in the compressor portion from a volume $V_1$ to a volume $V_2$ and progressively increased in the expander portion from a volume $V_3$ to a volume $V_4$, the inlet port of the compressor portion being connected to the pressurized fluid source, a heat exchanger connected between the compressor outlet port and the expander inlet port for removing heat from the fluid being cooled, means for varying volume $V_3$ relative to volume $V_2$ thereby to maintain substantially the same fluid pressure at the respective ends of the heat exchanger, and means for varying the volume $V_1$ with respect to the volume $V_4$ so that the work done on the fluid in the compressor portion during each shaft revolution is less than the work done by the expansion of the fluid in the expander portion during such shaft revolution with the result that the rotor is driven by the pressurized fluid being cooled.

6. A rotary unitary compressor-expander for use as a refrigeration device in conjunction with a pressurized fluid source having a pressure above the ambient level, comprising in combination, a stator including a chamber having compressor and expander portions, both the compressor and expander portions having inlet and outlet ports, a rotor rotatably mounted within the stator and having a plurality of vane slots, end plates for supporting the rotor and sealing the chamber, a plurality of slidable vanes mounted in the vane slots and outwardly biased so that the tips of the vanes are maintained substantially in contact with the wall of the chamber to form individual cavities the volumes of which are progressively decreased in the compressor portion and progressively increased in the expander portion, the inlet port of the compressor portion being connected to the pressurized fluid source, a heat exchanger connected between the compressor outlet port and the expander inlet port for removing heat from the fluid being cooled while maintaining a substantially constant fluid pressure, and means for varying the arcuate position of the compressor portion inlet port to vary the volume of the fluid admitted upon passage of each vane, the volume being reduced to the point where the work done on the fluid in the compressor portion during each shaft revolution is less than the work done by the expansion of the fluid in the expander portion during such shaft revolution so that the rotor is driven from the pressurized fluid being cooled.

7. The combination as claimed in claim 6 wherein the means for varying the arcuate position of the compressor portion inlet port comprises a thin band fitted in a recess in the chamber wall and positionable to selectively seal portions of the inlet port whereby the position of the band controls the volume of fluid admitted upon passage of each vane.

8. A combined pressurizing and refrigerating system for an aircraft having a jet engine which includes a compressor stage and having a pressurized cabing comprising in combination, a stator including a chamber having compressor and expander portions, both the compressor and expander portions having inlet and outlet ports, a rotor rotatably mounted within the stator and having a plurality of radially slidable vanes forming cavities which are progressively decreased in the compressor portion and progressively increased in the expander portion, the inlet port of the compressor portion being connected for supplying of air from the compressor stage of the engine, the outlet port of the expander portion being connected for discharge of the cooled air into the cabin, a heat exchanger connected between the compressor outlet port and the expander inlet port, said heat exchanger being located outside of the cabin for removing heat from the fluid while maintaining a substantially constant pressure, and a relief valve set to vent air from the cabin at the desired cabin pressure, the compressor and expander portions being non-symmetrically positioned so that more work is done by the fluid in the expander portion during each shaft revolution than is consumed by compression of the fluid in the compressor portion during such revolution, with the result that the rotor is driven by reason of the potential energy contained in the pressurized air from the engine.

* * * * *